June 25, 1940.         E. G. SAUTER ET AL         2,205,733
MEANS FOR ILLUMINATING LEVELS
Filed Aug. 29, 1938
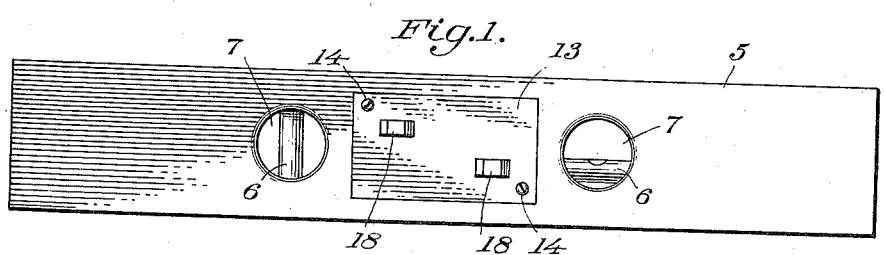
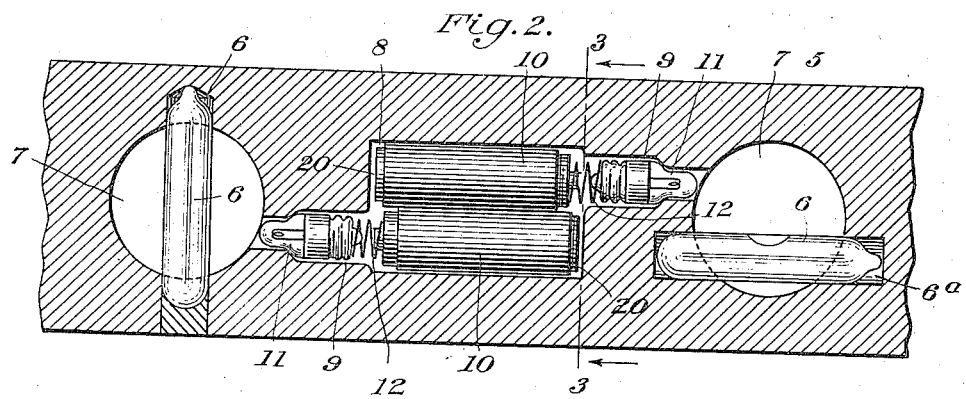
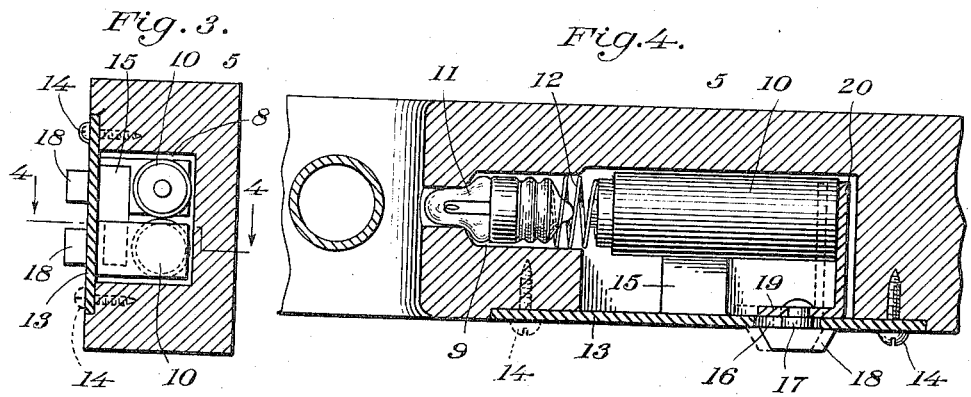
Earl G. Sauter:
Fred Notwell:
INVENTORS
BY Victor J. Evans & Co.
ATTORNEYS Patented June 25, 1940

2,205,733

UNITED STATES PATENT OFFICE 2,205,733

MEANS FOR ILLUMINATING LEVELS

Earl G. Sauter, Chicago, and Fred Notwell, Berwyn, Ill.

Application August 29, 1938, Serial No. 227,404

2 Claims. (Cl. 240—6.44)

Our invention relates to spirit levels and has as one of the principal objects thereof the provision of a spirit level equipped with means for illuminating the spirit tubes therein whereby the position of the bubbles of said tubes may be readily observed.

Another object of our invention is to provide a level of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a side elevation of our invention.

Figure 2 is a fragmentary longitudinal sectional view thereof.

Figure 3 is a sectional view taken on the line 3—3 of Figure 2.

Figure 4 is a detail sectional view taken on the line 4—4 of Figure 3.

In practicing our invention we provide a level block 5 equipped between the ends thereof with a pair of spaced oppositely extending spirit tubes 6 supported in recesses 6a within said block and extending through sight openings 7 formed through said block. On one side of said block the outer face thereof, between said sight openings, is formed with a rectangular shaped recess 8. The block is also formed with passages 9 extending from the upper and lower opposite corners of said recess 8 and communicating with the respective sight openings 7 as clearly illustrated in Figure 2 of the drawing. Positioned within said recess 8 are a pair of coextending electric batteries 10, the centrally disposed positive terminals of which are aligned axially with relation to the passages 9. The outer ends of the passages 9 adjacent the sight openings 7 are of a lesser diameter than the opposite end sections and accommodate therein the outer reduced ends of electric light bulbs 11, the large ends of said electric light bulbs being disposed within the passages 9 adjacent the recess 8. Secured about the casings of the batteries, adjacent the positive terminal thereof, are the inner ends of coil springs 12, the outer ends of which engage the threaded bushings of the bulbs 11 and thereby establish electric connection between the batteries casings and said bushings. Said spring normally serves to space the positive terminals of said batteries out of engagement with the centrally disposed terminals of the bulbs. A plate 13 recessed within the outer face of the block serves to close the outer end of the recess 8. Said plate is secured to said block by means of screws 14. The inner face of said plate 13 is fashioned with an inwardly projecting section 15 engaging the peripheries of batteries and maintaining the latter spaced relative to said plate. The plate 13 is formed with a pair of elongated slots 16 overlying the respective batteries and extending through said slots are pins 17, the outer ends of which have secured thereto finger pieces 18. The inner ends of the pins 17 have riveted thereto slide members 19 formed with angularly disposed arms 20 engaging the rear ends of the batteries.

Obviously, when a finger piece 18 is moved relative to the plate, the battery through the medium of the angularly disposed arm of said slide 19 will likewise be moved against the tension of the respective spring and effect contact between the centrally disposed contact of the bulb and battery, thereby completing the electric circuit and illuminating the respective bulb. Release of the finger piece serves to effect disconnection of the central terminals of the bulb and battery through the medium of the spring 19.

From the foregoing it will be apparent that we have provided a simple and efficient device whereby the spirit tubes of levels may be conveniently lighted when desired. It is to be distinctly understood that various modifications in the arrangement and constructions of the parts may be resorted to without departing from the spirit of the invention or scope of the appended claims.

What we claim is:

1. A device of the character described, comprising, a level block formed with spaced openings and a recess between said openings, spirit tubes carried by said block and extending across said openings, said block formed with constricted passages defining bulb seats therein and effecting communication between said openings and said recess, light bulbs seated in said passages for illuminating said tubes, batteries slidably mounted in said recess, springs connecting said batteries to said bulbs for maintaining the latter clamped against said seats and in a manner to normally maintain the centrally disposed terminals of said batteries spaced from like terminals of said bulbs, and means carried by said block and engaging said batteries for selectively moving said batteries towards said bulbs to effect contacts between said terminals of said bulbs and said batteries to illuminate said bulbs.

2. A device of the character described, comprising, a level block formed with spaced openings and a recess between said openings, spirit tubes carried by said block and extending across said openings, said block formed with constricted passages defining bulb seats therein and effecting communication between said openings and said recess, light bulbs seated in said passages for illuminating said tubes, batteries slidably mounted in said recess, springs connecting said batteries to said bulbs for maintaining the latter clamped against said seats and in a manner to normally maintain the central disposed terminals of said batteries spaced from like terminals of said bulbs, a plate covering said recess and having a section maintaining said batteries in adjusted position within said recess, slide members carried by said plate and engaging said batteries for selectively moving the latter to effect engagement of the contacts of the terminals of said batteries with the terminals of said bulbs to effect illumination of the latter.

EARL G. SAUTER.
FRED NOTWELL.